May 28, 1968  KWANGHO CHUNG  3,385,228
TRANSPORTATION SYSTEM
Filed April 16, 1965  3 Sheets-Sheet 1
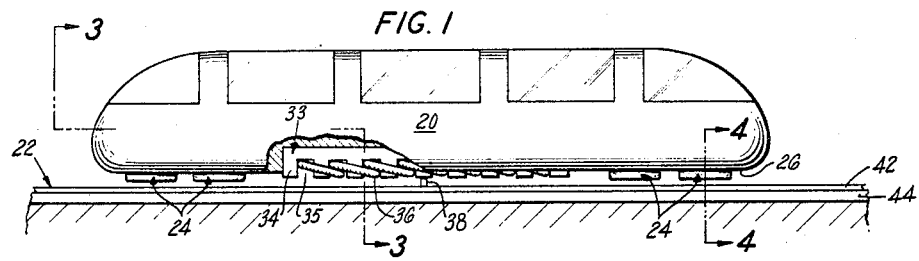
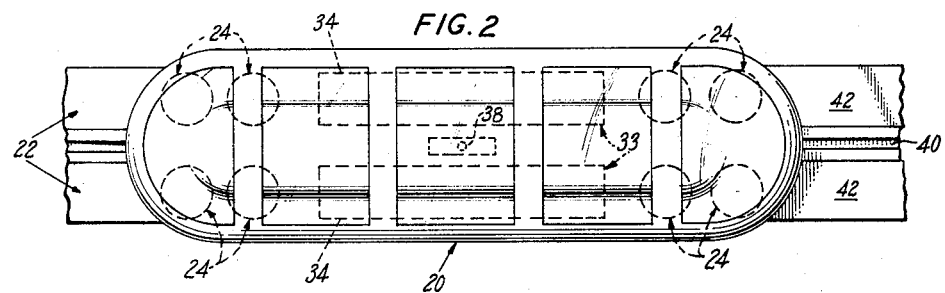
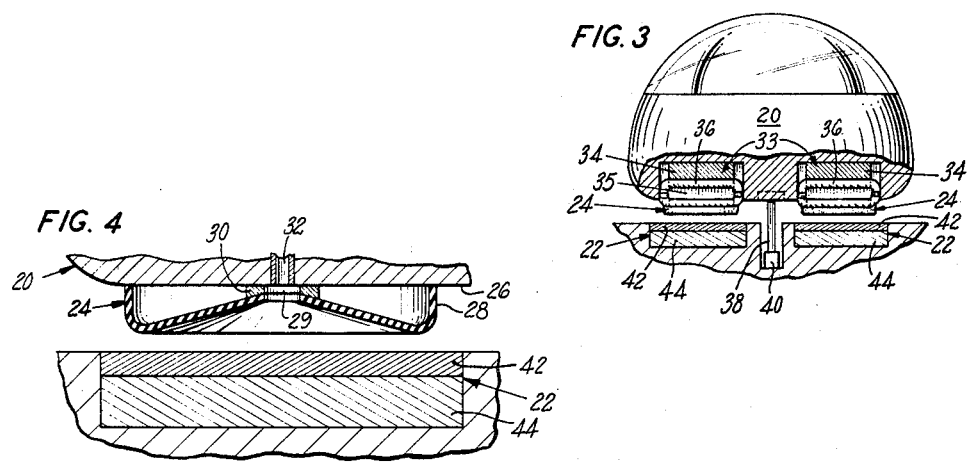
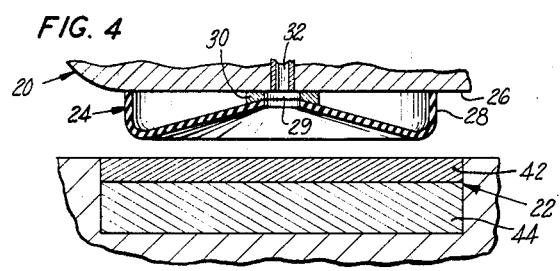
INVENTOR.
KWANGHO CHUNG
BY
Lindsey, Prutzman and Hayes
ATTORNEYS

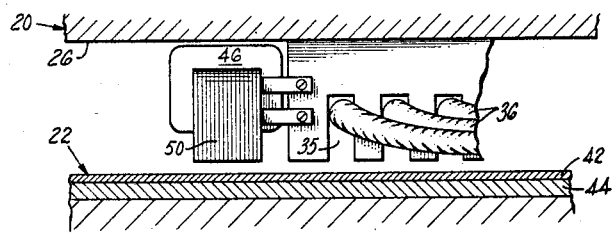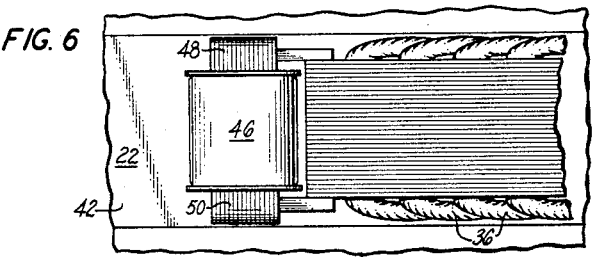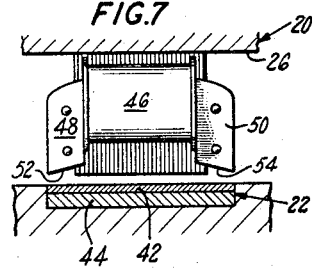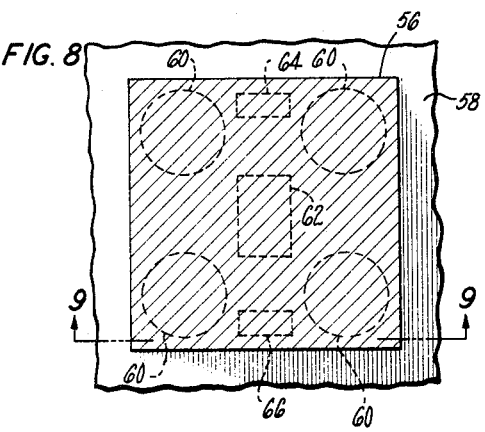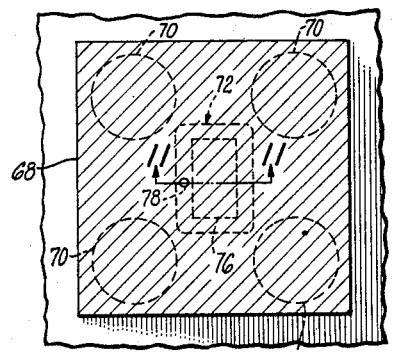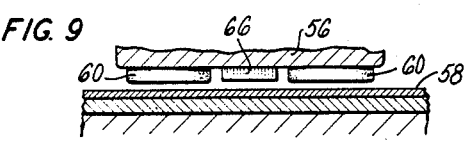

May 28, 1968  KWANGHO CHUNG  3,385,228
TRANSPORTATION SYSTEM

Filed April 16, 1965  3 Sheets-Sheet 3

INVENTOR.
KWANGHO CHUNG

BY
Lindsey, Prutzman and Hayes
ATTORNEYS

United States Patent Office 3,385,228
Patented May 28, 1968

3,385,228
TRANSPORTATION SYSTEM
Kwangho Chung, Hartford, Conn., assignor to Skinner Precision Industries, Inc., New Britain, Conn., a corporation of Connecticut
Filed Apr. 16, 1965, Ser. No. 448,728
11 Claims. (Cl. 104—134)

ABSTRACT OF THE DISCLOSURE

Apparatus for supporting, propelling and guiding of a vehicle utilizing air bearings for vertical support and a linear induction motor for propulsion and guidance. The stator is secured to the vehicle to cooperate with an electrically conductive track forming the armature of the motor with the air bearing cooperating with the track to provide support.

This invention relates to transportation systems and particularly concerns the utilization of electromagnetic force to propel vehicles along a track or the like.

One of the objects of this invention is to provide a transportation system in which electromagnetic forces acting between an electrically powered vehicle and a track are utilized to propel the vehicle.

Another object of this invention is to provide a transportation system in which electromagnetic force is utilized to drive a vehicle supported in spaced relation above a track solely by air pressure.

Another object of the present invention is to provide a transportation system featuring an air-supported electromagnetically propelled vehicle guided along its path of movement by electromagnetic force.

Still another object of this invention is to provide an electromagnetically powered vehicle which may be maneuvered laterally as well as propelled forwardly by electromagnetic forces.

A further object of the present invention is to provide an electromagnetically powered vehicle supported by air under pressure which is also utilized to cool the magnetic propulsion unit of the vehicle.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a side elevation view, partially broken away, of a vehicle embodying the present invention;

FIG. 2 is a top plan view, partially broken away, of the vehicle shown in FIG. 1;

FIG. 3 is a cross-sectional view taken along the line 3—3 in FIG. 1;

FIG. 4 is an enlarged cross-sectional view taken along the line 4—4 in FIG. 1;

FIG. 5 is a fragmentary side elevation view of another embodiment of the present invention;

FIG. 6 is a fragmentary top plan view of the structure shown in FIG. 5;

FIG. 7 is an end view of the structure shown in FIG. 5;

FIG. 8 is a schematic top plan view of another embodiment of the invention;

FIG. 9 is a cross-sectional view taken along the line 9—9 in FIG. 8;

FIG. 10 is a schematic top plan view of still another embodiment of the invention;

Figure 11:
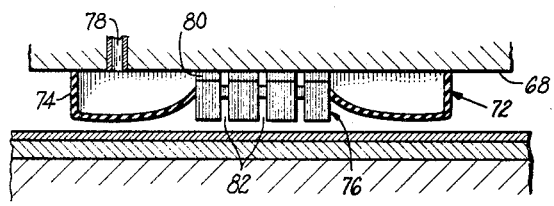
FIG. 11 is a cross-sectional view taken along the line 11—11 in FIG. 10.
Figure 12:
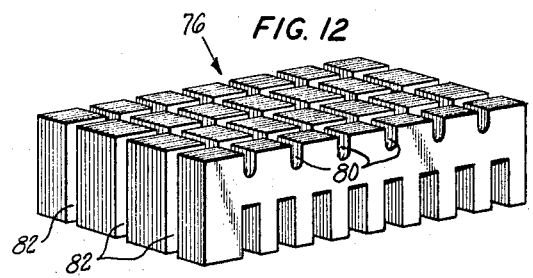
FIG. 12 is a perspective view of the magnetic core structure of the vehicle shown in FIG. 10.

The vehicle and air bearing system illustrated in the drawings are of the type shown and described in United States Patent 3,096,728, Amann et al., and the motive power for driving such vehicles is supplied by linear induction motors of the general type disclosed in United States application Ser. No. 400,175, filed Sept. 29, 1964, by K. Chung and G. A. Francis. Briefly, such motors comprise a stator having a laminated ferromagnetic core structure provided with a series of spaced slots in which are located a plurality of field coils in the stator slots to form a two-layer single coil lap wound stator. The field coils are electrically connected to a suitable multi-phase alternating current source thereby to produce an electromagnetic field which, in accordance with conventional induction motor theory, moves along the slotted surface of the stator. Cooperating with the stator is an armature or driven member of elongated configuration comprising a continuous conductor formed from a material such as copper and a coextensive ferromagnetic member which forms the return path for electromagnetic flux produced by the stator.

Referring to the drawings, a motor of the general character just described is utilized to drive a vehicle 20 along a track 22, vehicle 20 being supported in spaced relation above the track 22 by a plurality of air bearings 24 disposed on the bottom wall 26 of the vehicle.

In the manner more fully disclosed in the aforementioned U.S. Patent No. 3,096,728, each air bearing 24 comprises a flexible diaphragm 28 hermetically secured around its edges to the bottom wall 26 and provided with a central opening 29, the edges of which are spaced from the bottom wall 26 by the spacers 30. It will be understood that the air bearings 24 need not necessarily be circular, but may be elongated, for example, with correspondingly elongated central openings, and that the configuration and number of air bearings will be determined by the size and weight of the vehicle to be supported. Each air bearing 24 is provided with an air inlet 32 for admitting a continuous flow of air under pressure from a suitable source (not shown) capable of producing compressed air at the desired pressure.

The air entering the chamber formed by the flexible diaphragm 28 passes downwardly through the central opening 29 into the chamber below the flexible diaphragm 28 and then out through the gap between the periphery of the diaphragm and the track 22. Low pressure air bearings of this general character are capable of supporting very great loads in spite of the fact that the air pressure underneath such bearings is only moderately above atmospheric pressure.

Motive power for the vehicle 20 is furnished by a propulsion unit 33 having a ferromagnetic core structure 34, which in the present embodiment is divided into two parallel sections mounted on the bottom wall 26 so as to be positioned in close proximity to the track 22 when the vehicle 20 is supported by the air bearings 24. The ferromagnetic core structure 34 is formed with a plurality of spaced slots 35 within which are positioned a plurality of coils of wire 36 arranged to produce an electromagnetic field that moves along the path of movement of the vehicle 20 when they are connected to a suitable multiphase source of alternating current. For this purpose the vehicle 20 is provided with a power pickup shoe 38 arranged to ride in contact with a power rail 40 disposed along the length of the track 22. If single phase alternating current is supplied by the power rail 40 it will be understood that a suitable phase splitting capacitor will be mounted in the vehicle 20 so as to provide for the supply of multiphase power to the coils 36.

The track 22 is a two-layer structure suitably supported on the surface over which the vehicle 20 is to run and comprises a continuous conductive member 42 forming its top surface and a coextensive ferromagnetic member 44. For example, the track 22 may comprise a layer of copper or aluminum forming the conductive member 42 laminated on a base of mild steel forming the ferromagnetic member 44.

When the vehicle 20 is in operation it is supported by the air bearings 24 so that it is capable of practically frictionless movement along the track 22. Upon energization of the coils 36 the resulting electromagnetic field which moves along the length of the ferromagnetic core structure 34 interacts with the track 22 to produce an induced force which drives the vehicle 20 along the track.

In the embodiment of the invention illustrated in FIG. 5 an electromagnet 46 is mounted below the bottom wall 26 of the vehicle 20 for the purpose of maintaining the vehicle 20 in alignment with the track 22. The electromagnet 46 is positioned in transverse relation to the track 22 and is provided with a pair of downwardly extending legs 48, 50 terminating in slightly inclined pole faces 52, 54 spaced a short distance above opposing edge portions of the track 22. Thus the legs 48, 50 of the electromagnet 46 are magnetically linked to the ferromagnetic member 44 and the forces of attraction across the air gaps between the pole faces 52, 54 and the track 22 are equal so long as the vehicle 20 remains in alignment with the track 22. However, if the vehicle 20 is moved transversely by some external force, to the left for example as viewed in FIG. 7, the magnetic force linking the pole face 52 to the track 22 decreases and thus an unbalanced force condition is created which moves the electromagnet 46 and the vehicle 20 back to a centered position along the track 22. In this way lateral stability of the vehicle 20 may be maintained solely by electromagnetic force and the need for mechanical guiding structure is eliminated.

In the embodiment of the invention schematically illustrated in FIG. 8 a vehicle bottom wall or platform 56 is supported on a supporting surface 58 by four air bearings 60 which are structurally and functionally similar to the air bearings 24 previously described. The supporting surface 58 resembles the track 22 in that it is formed of a layer of conductive material, such as copper, overlying a layer of ferromagnetic material such as mild steel. Motive power for the platform 56 is provided by a centrally mounted main propulsion unit 62 and a pair of auxiliary propulsion units 64, 66 secured to the bottom of the platform in fore-and-aft relation to the main propulsion unit 62 and oriented at right angles thereto.

Each of the propulsion units 62, 64 and 66 is similar to the propulsion unit 33 of the vehicle 20, previously described, and includes a slotted ferromagnetic core structure having a plurality of coils of wire thereon connected to a suitable multi-phase source of alternating current. By virtue of the locating and orientation of the auxiliary propulsion units 64, 66, the platform 56 may be maneuvered over the supporting surface 58 in any direction. Thus the main propulsion unit 62 may be energized to propel the platform 56 forwardly or to the rear while lateral movement may be achieved by energizing the auxiliary propulsion units 64, 66 so that their moving electromagnetic fields move in the appropriate direction. Further, if the auxiliary propulsion units 64, 66 are energized so that their electromagnetic fields move in opposite directions, the platform 56 may be cause to rotate. It will, of course, be understood that the platform 56 is provided with a suitable source of electric power such as an engine driven generator mounted thereon and that it includes suitable control circuits and reversing switches for controlling the energization of the propulsion units.

In the embodiment of the invention schematically illustrated in FIG. 10, the flow of air which supports the vehicle 68 upon a surface such as the track 22 or the supporting surface 58, previously described, serves the additional purpose of cooling the propulsion unit of the vehicle. For this purpose the vehicle 68 is provided with four air bearings 70 disposed adjacent the corners of the platform 68, and in addition there is provided a central air bearing 72 comprising a flexible diaphragm 74 of toroidal configuration surrounding the ferromagnetic core structure 76 and hermetically secured at its outer edges to the bottom surface of the vehicle 68 and at its inner edges to the side walls of the core structure 76. The interior of the air bearing 72 is supplied with compressed air through a suitable air duct 78 and the air flowing therein emerges through the core structure 76 by virtue of the fact that horizontal slots 80 and vertical passageways 82 are formed therein. Thus the air flowing through the air bearing 72 is utilized to cool the core structure 76 and after performing this function it enters the plenum chamber formed by the lower surface of the flexible diaphragm 74 and the surface upon which the vehicle rests to aid in supporting the weight of the vehicle.

Figure 13:
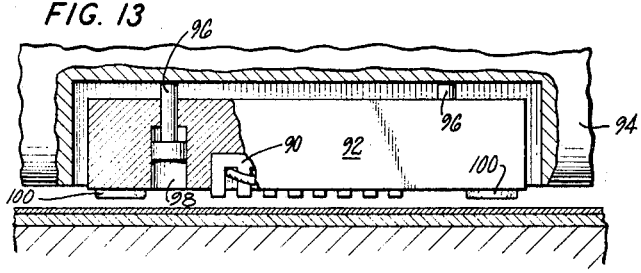
FIG. 13 is an illustration of an alternative embodiment of the vehicle of FIG. 1.

In the event that vehicle loads vary in magnitude, such that the vehicle bearings do not maintain the desired separation or air gap between the armature and stator components of the induction motor, separate propulsion unit mounting can be provided as illustrated in FIG. 13. The stator 90 is secured to a support frame 92 which in turn is connected to the vehicle 94 by drive posts 96 received in apertures 98 in frame 92 so as to permit limited relative vertical movement between vehicle 94 and stator 90 while transmitting desired propulsion forces to the vehicle. Air bearings 100 are thus required to support only the relatively constant load of the propulsion unit, thereby permitting the bearings to maintain a relatively constant air gap between stator and track to maintain motor efficiency at various vehicle loads.

Figure 14:
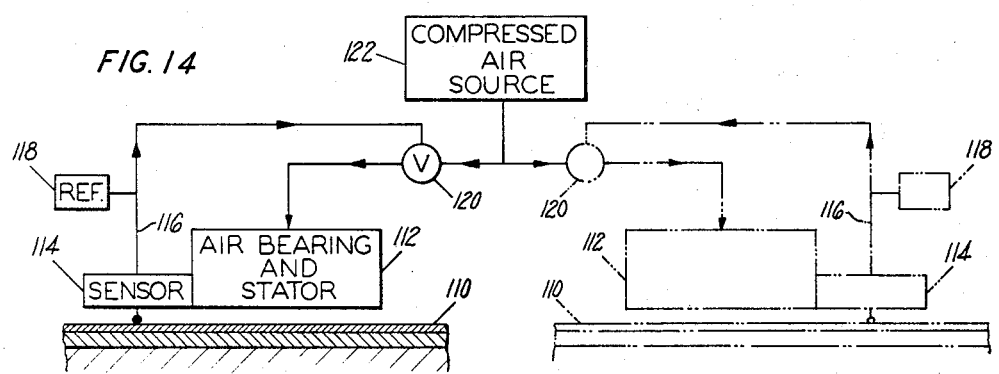
FIG. 14 is a schematic diagram of an air bearing control system suitable for the vehicle of FIG. 1.

FIG. 14 illustrates an alternative embodiment of this invention whereby the vehicle air supply to the bearings is varied by any suitable servomechanism to maintain the desired air gap spacing between the armature or track 110 and the stator 112. In a typical system, the air gap spacing is measured by any suitable sensor 114 whose output 116 is compared with a reference 118 to control valve 120 thereby to vary the quantity of air supplied from source 122 to bearing 112 thereby to maintain the desired air gap.

From the foregoing it will be evident that the present invention provides a transportation system including a vehicle supported by air pressure in proper relation to a supporting surface having magnetic properties to permit electromagnetic forces acting between a propulsion unit in the vehicle and the surface to drive the vehicle. Further, by utilizing transversely oriented electromagnets or auxiliary propulsion units the vehicle may be guided or maneuvered in such a way that mechanical guiding structures are unnecessary and the vehicle is capable of essentially frictionless movement along its path of travel. In addition, in those instances in which excessive heat is generated in the core structure forming a part of the propulsion unit of the vehicle the invention provides means for utilizing the air flow which supports the vehicle to serve the additional purpose of cooling the core structure, thus simplifying the mechanical construction of the vehicle.

As will be apparent to persons skilled in the art, various modifications and adaptations of the structure above described will become readily apparent without departure from the spirit and scope of the invention, the scope of which is defined in the appended claims.

What is claimed is:

1. A transportation system comprising a vehicle, an elongated structure of magnetic material secured to said vehicle, a plurality of coils of wire distributed along the length of said structure, guide means mounted on said vehicle, means for connecting said coils to a multi-phase source of alternating current to produce an electromagnetic field that moves along the length of said structure, a track for said vehicle including a continuous conductive member and a magnetic member parallel thereto and low pressure air bearing means cooperating with said track for supporting said vehicle for movement along said track with said elongated structure in close proximity to and in alignment with said track, said conductive member and said magnetic member being disposed so as to cooperate with the moving electromagnetic field produced by said elongated structure and the guide means to provide magnetic force for propelling and guiding said vehicle along said track.

2. The system as set forth in claim 1 wherein said low pressure air bearing means includes means for varying the supply of air to the bearing means thereby to permit maintenance of the spacing between the vehicle and track.

3. A transportation system comprising a vehicle, an elongated structure of magnetic material secured to said vehicle, a plurality of coils of wire distributed along the length of said structure, means for connecting said coils to a multi-phase source of alternating current to produce an electromagnetic field that moves along the length of said structure, a track for said vehicle including a continuous conductive member and a magnetic member parallel thereto, air bearing means on said vehicle cooperating with said track for supporting said vehicle for movement along said track with said elongated structure in close proximity to and in alignment with said track, said conductive member and said magnetic member being disposed so as to cooperate with the moving electromagnetic field produced by said elongated structure to provide magnetic force for propelling said vehicle along said track.

4. A transportation system comprising a vehicle, an elongated structure of magnetic material secured to said vehicle, a plurality of coils of wire distributed along the length of said structure, means for connecting said coils to a multi-phase source of alternating current to produce an electromagnetic field that moves along the length of said structure, a track for said vehicle including a continuous conductive member and a magnetic member parallel thereto, and air bearing means on said vehicle cooperating with said track for supporting said vehicle for movement along said track with said elongated structure in close proximity to an in alignment with said track, said conductive member and said magnetic member being disposed so as to cooperate with the moving electromagnetic field produced by said elongated structure to provide magnetic force for propelling said vehicle along said track, and an electromagnet carried by said vehicle, said electromagnet having a pair of laterally spaced legs extending toward opposing edges of said track, whereby the magnetic forces linking said electromagnet and said magnetic member tend to prevent lateral movement of said vehicle.

5. A transportation system as set forth in claim 1 in which said air bearing means includes a flexible diaphragm extending downwardly below said vehicle and encircling said elongated structure to form an air chamber of toroidal configuration, means for directing a flow of air into said chamber, and means for discharging air from said chamber along the lower surface of said diaphragm including a plurality of passageways in said elongated structure.

6. A transportation system as set forth in claim 3 in which said electromagnetic means comprises a pair of auxiliary elongated structures of magnetic material secured to said vehicle adjacent the front and rear thereof respectively, the major axes of said auxiliary elongated structures being horizontal and transverse to said track, and means for producing electromagnetic fields that move along the length of each of said auxiliary elongated structures.

7. A transportation system as set forth in claim 6 including switching means for selectively reversing the directions of movement of each of said electromagnetic fields.

8. A transportation system comprising a vehicle, an elongated structure of magnetic material, means mounting said elongated structure to said vehicle for movement therewith in a horizontal plane and for movement relative thereto in a vertical plane, a plurality of coils of wire distributed along the length of said structure, means for connecting said coils to a multi-phase source of alternating current to produce an electromagnetic field that moves along the length of said structure, a track for said vehicle including a continuous conductive member and a magnetic member parallel thereto, air bearing means on said vehicle cooperating with said track for supporting said vehicle for movement along said track, and means independent of said vehicle support means for supporting said elongated structure for movement along said track with said elongated structure in close proximity to and in alignment with said track, said conductive member and said magnetic member being disposed so as to cooperate with the moving electromagnetic field produced by said elongated structure to provide magnetic force for propelling said vehicle along said track.

9. The system as set forth in claim 8 wherein said means for supporting said elongated structure comprises low pressure air bearings which discharge air to cool the elongated structure and coils of wire thereon.

10. The system as set forth in claim 1 wherein said guide means comprises additional electromagnet means carried by said vehicle for producing magnetic forces transversely to said track linking said additional electromagnetic means and said magnetic member independently of said propelling magnetic force for guiding said vehicle and maintaining it against lateral movement relative to said track.

11. The system as set forth in claim 1 wherein said low pressure air bearing means is provided on said vehicle in coaxial alignment with both said elongated structure and said track.

References Cited

UNITED STATES PATENTS

| | | | |
|---|---|---|---|
| 782,312 | 2/1905 | Zehden | 310—13 |
| 2,691,946 | 10/1954 | Marmo | 104—148 |
| 3,096,728 | 7/1963 | Amann et al. | 104—134 |
| 3,125,964 | 3/1964 | Silverman. | |
| 3,164,103 | 1/1965 | Lathers et al. | 104—134 |
| 3,225,228 | 12/1965 | Roshala | 104—148 X |
| 3,233,559 | 2/1966 | Smith et al. | 104—148 |

FOREIGN PATENTS

| | | |
|---|---|---|
| 13,492 | 8/1891 | Great Britain. |

ARTHUR L. LA POINT, *Primary Examiner.*

J. E. BABER, D. F. WORTH, *Assistant Examiners.*